Figure 1:
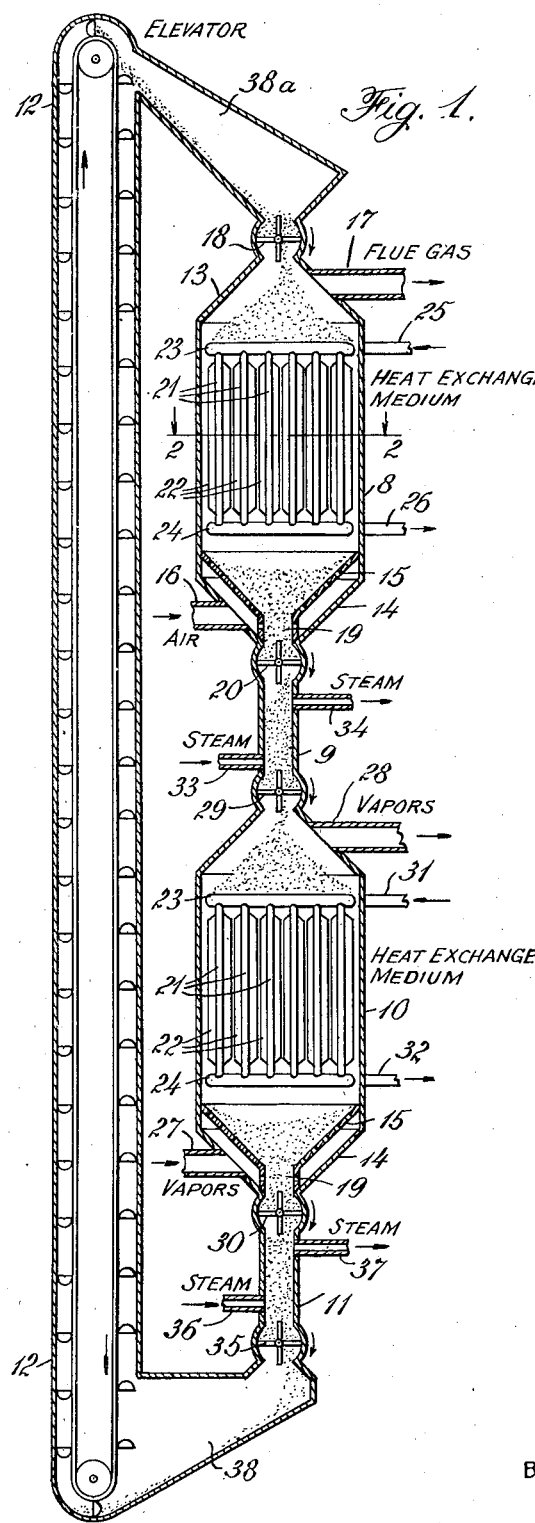

June 26, 1945. T. P. SIMPSON ET AL 2,379,195
APPARATUS FOR CATALYTIC CONVERSION
Filed July 22, 1942 2 Sheets-Sheet 1

INVENTORS
Thomas P. Simpson,
John W. Payne and
John A. Crowley, Jr.
BY
ATTORNEY

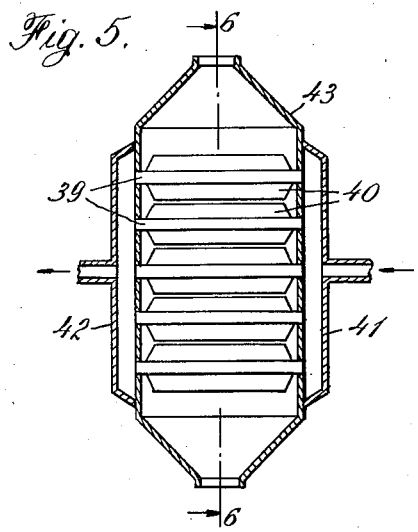
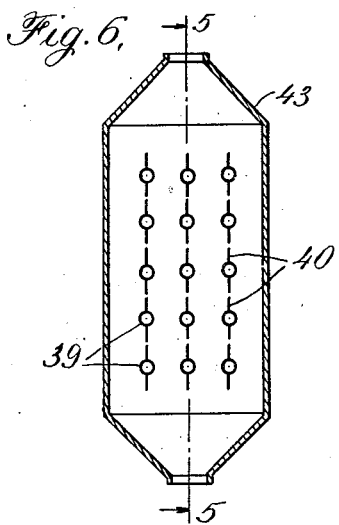
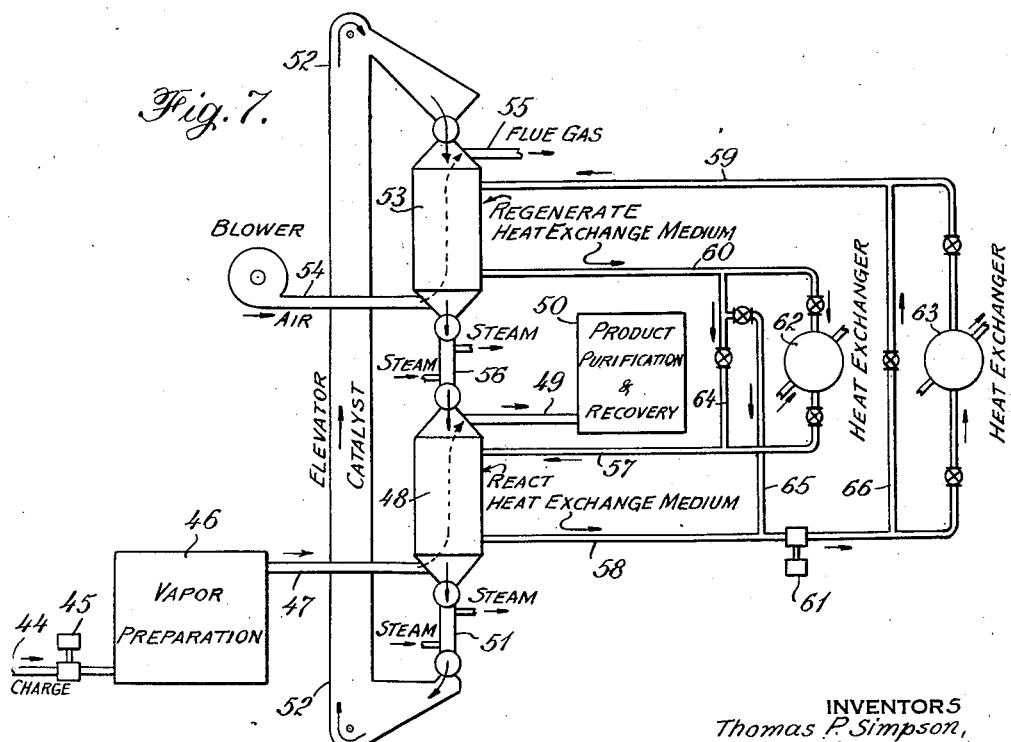

Patented June 26, 1945

2,379,195

UNITED STATES PATENT OFFICE 2,379,195

APPARATUS FOR CATALYTIC CONVERSION

Thomas P. Simpson, John W. Payne, and John A. Crowley, Jr., Woodbury, N. J., assignors to Socony-Vacuum Oil Company, Incorporated, a corporation of New York Application July 22, 1942, Serial No. 451,859

2 Claims. (Cl. 23—260)

This invention has to do with chemical reactions which are conducted in the presence of a contact mass, such as, for example, the catalytic conversion of hydrocarbons, and is more particularly concerned with apparatus for carrying out such reactions.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, desulfurizing, partial oxidation, and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operation as exemplary, without, however, intending to be limited thereby or thereto except by such limits as may appear in the claims.

Such catalytic processes generally make use of reaction chambers containing a fixed body of catalyst or contact mass through which the reaction mixture is passed and in which, after the reaction has slowed down to an uneconomic point, the contact mass is regenerated in situ. Such processes are not continuous and only attain continuity by the provision of numerous reaction chambers which are alternately placed on stream and on regeneration. Likewise, it is difficult to maintain constant quantity and quality of product without numerous chambers and intricate scheduling, because of the progressively decreasing activity of catalyst. This same feature, with apparatus limitations, prevents, to a degree, the use of catalyst, at a uniform high efficiency level. Most of these difficulties may be avoided by the use of a method wherein the catalyst or contact mass is handled continuously as well. This invention is specifically directed to an apparatus system using such a process.

This invention contemplates an apparatus for hydrocarbon oil conversion wherein a continuously-moving stream of hydrocarbon oil, preferably in the form of vapor heated to conversion temperature, is contacted with a continuously-moving stream of catalyst. Important advantages of the apparatus contemplated herein are that the catalytic material is used only at a high level of efficiency and is continuously regenerated and returned to the conversion step, both operations being conducted under controlled conditions. The said high level of catalyst efficiency and constant uniformity in the character of the regenerated catalyst are obtained primarily by controlling the conditions in the regenerating zone so that the temperature of the catalyst (from which, in the case of hydrocarbon conversion, carbonaceous deposits must be oxidized or burned) is maintained within the temperature range for efficient regeneration and at the same time is not permitted to rise above the maximum combustion temperature which would cause substantial heat-damage to the catalyst particles.

This temperature control in the regenerator is accomplished by effecting a positive thermal exchange between the moving catalyst mass and a heat exchange medium maintained within the moving mass or body of catalyst in indirect heat transfer relation therewith. In the regeneration of catalyst in a hydrocarbon conversion or continuous catalytic cracking operation, where regeneration involves an exothermic reaction, heat is positively extracted from within the moving mass of catalyst in the regenerating zone so that the temperature in such zone is not permitted to rise to a point where the catalyst particles would be damaged and at the same time the rate of withdrawing such heat is such that an efficient regenerating or combustion temperature is maintained. As will hereinafter appear, this positive withdrawal of heat is effected by a plurality of heat transfer tubes extending into the mass of catalyst moving through the zone or chamber in which it is regenerated. These tubes may be either parallel with or transverse to the direction of catalyst flow.

This invention is based upon the principle of carrying out catalytic reactions by flowing a stream of reaction mixture in physical contact with a flowing stream of catalytic material through a reaction zone in which it is in heat exchange relationship with a heat exchange medium at a controlled temperature.

The present invention has for its principal object the provision of proper apparatus in which such a process may be carried out. The process described herein forms the subject matter of our companion application, Serial No. 451,858, filed concurrently herewith, now U. S. Patent 2,320,318.

In order that this invention may be understood, reference is made to the drawings attached to and made a part of this specification. In these drawings, Figure 1 shows in diagram form a reaction and regeneration apparatus. Figures 2, 3, 4, 5, and 6 are concerned with internal details of such chambers, and Figure 7 shows in diagram form a set-up of apparatus suitable for the conversion of hydrocarbon oils.

In Figure 1, character 8 denotes a regeneration chamber, 9 a purging section, 10 a reaction chamber, 11 a second purging section, and 12 an elevator for catalyst particles. Regeneration chamber 8 and reaction chamber 10 are similar in construction and internal fittings and consist (referring now to 8) of an exterior shell 8, which may be cylindrical or rectangular in cross-section, with a convergent sealed top 13 and a convergent bottom 14, and fitted with an interior false bottom 15, which is perforate, the perforations therein being too small for the passage of catalyst particles but permitting the passage of liquid or gas. Bottom 14 is fitted with pipe 16, and top 13 with pipe 17. At the top of 13 is a sealed feeding device 18, which may be a star wheel as shown, an intermittently-operated valve set-up or other common device of this nature. Catalyst material introduced through 18 fills the interior of shell 8, passes down therethrough, is collected by false bottom 15 and chute 19 and is removed by a second intermittently-operating device, such as star wheel 20. This arrangement effects a continuously-moving stream of catalytic material through shell 8.

Reaction mixture—in this case, air for an oxidizing regeneration—may be introduced through pipe 16, and products of reaction—in this case, flue gas—may be removed through pipe 17. This effects a continuously-flowing stream of reaction material in physical contact with the continuously-flowing stream of catalytic material in shell 8. The flow shown is countercurrent. If desired, it may be made concurrent by reversing the functions of 16 and 17.

Shell 8 is also internally fitted with a series of conduits 21 equipped with fins 22 joined to headers 23 and 24 through which a heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material. Thus, in the regenerator 8 the temperature of the mass of catalyst under regeneration is closely controlled by effecting a positive exchange of heat between the catalyst and the heat transfer medium mantained within the body of catalyst and in indirect heat exchange relation therewith throughout the conduit system illustrated in Figures 1 and 2 as comprising tubes 21. Shell 10 is similarly fitted and similarly operated.

Reaction material—in this case, hydrocarbons—is introduced by 27 and removed by 28; catalyst movement is controlled by 29 and 30; and heat exchange medium is circulated by pipes 31 and 32. Confined passage 9, maintained relatively full of catalyst by devices 20 and 29, is fitted with pipes 33 and 34, by means of which steam may be passed through the catalyst for purging, thereby preventing the passage of regenerating agent into the conversion chamber. This section 9 provides a catalyst "leg" which with the purging means provides a substantially gas-tight seal interposed between the two chambers. A similar purging passage 11 connects with the bottom portion of shell 10 and is shown as being controlled by devices 30 and 35. The leg or passage 11 is fitted with steam connections 36 and 37 for purging the catalyst after the reaction or conversion step so as to prevent hydrocarbons other than deposited on the spent catalyst being conducted from the bottom of the conversion chamber 10 into the regenerating chamber 8. From 11 the catalyst drops through 35 into boot 38 of elevator 12, by which it is elevated and discharged into bin 38a above shell 8. Elevator 12 may be of the belt and bucket type shown or of any other kind suitable for the physical properties of the catalytic materials.

It will be apparent from the foregoing that the apparatus shown in Figure 1, wherein there is a controlled gravity flow of catalyst through shells or chambers 8 and 10 into the feed boot 38 of the elevator 12, which returns the spent catalyst to the inlet of shell 10, provides means for carrying out the continuous catalytic process contemplated herein with high thermal efficiency because there is a general continuous movement of catalyst through the system substantially directly from one chamber to the other, and the hot catalyst does not have an opportunity to cool to atmospheric temperature during its movement through the circuit. Obviously, arrangements other than that described above may be employed to effect the movement of catalyst substantially directly from each zone to the other without permitting it to cool to atmospheric temperature.

Customary devices for the removal of fines and the addition of makeup may be inserted in the catalyst conveyor system.

Special attention should be given to the arrangement of heat exchange tubes within the shells 8 and 10. These should be so arranged as to permit the passage of catalytic material and reaction material longitudinally through the shell in such manner that the flowing material is brought into the desired heat exchange relationship with heat exchange medium. The conduits may be unfinned, but better results are obtained if the external heat transfer surface of the heat exchange tubes is augmented by the addition of fins thereto. These fins, primarily added for heat transfer reasons, may be taken advantage of to assist in control of the flow of catalyst and reaction fluid and contact therebetween by being disposed so that they, together with the tubes, divide the space within the shell into a series of longitudinal passages of substantially constant cross-section throughout their length. The arrangement of these passages should be such that the reaction material or catalyst moving through the shell comes in efficient heat exchange relationship with the heat exchange medium in the tubes. The proper dimensions for this condition depend somewhat upon the physical nature of the catalyst. A commonly-used catalyst for such purposes is a rod-shaped clay particle about 2½ mm. diameter by 4 mm. average length, and with such particles it is desirable that the passages be so arranged that no catalyst particle will be further removed from a heat extractive surface than about 1 inch, and the total volume in cubic inches of the passages containing catalyst and reaction mixture be numerically about one-eighth to twice the surface in square inches of the heat transfer surface in contact with the passages. Catalyst particles of different heat-conductivity or of different packing characteristics, or variations in the contemplated intensity of reaction per unit volume of catalyst, as well as considerations of heat transfer and pressure drop will vary the ratio somewhat. The length of the paths through which the catalyst moves during reaction and regeneration should be relatively great, say from 3 to 15 feet or more.

Figure 2:
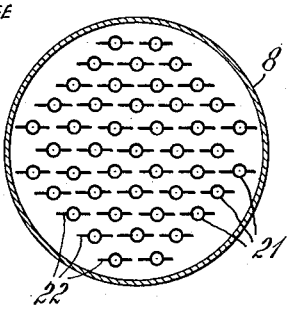
Figure 3:
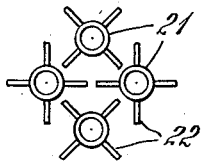
Figure 4:
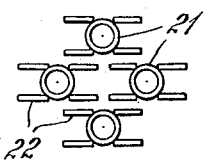

Figure 2 shows a cross-section of case 8 at the level 2—2 showing how the preferred longitudinal passages may be formed by equipping each heat exchange tube with two diametrically-opposed, longitudinally-disposed axial fins. Figures 3 and 4 show other ways of arriving at the same result. The heat transfer tubes need not be arranged parallel to the flow of catalyst but may well be transverse thereto, as shown in Figures 5 and 6, wherein transverse tubes 39, carrying fins 40, extend between header boxes 41 and 42 in a shell 43, to exercise the same functions as corresponding parts in shells 8 and 10; and, as aforesaid, the spacing and arrangement of the heat exchange tubes or conduits may be varied depending upon the character of the catalyst and the intensity of the regenerating reaction.

The heat exchange medium may be any fluid suitable for the load and temperature levels encountered, such as gases, liquids of various kinds, molten metals, or alloys, or fused salts. Preferably, it should be possessed of a low vapor pressure, low viscosity, and high specific heat at temperatures between 600° and 1100° F., non-corrosive to steel, and fluid at about 300°–350° F. so that it may be removed from shut-down apparatus by steam heating. Convenient materials for such use are mixtures of the strong alkali salts of the oxy-acids of nitrogen.

Passages 9 and 11, used for purging by passing steam through the catalyst particles, should be so proportioned that a sufficient contact of steam and catalyst particles occurs to remove most of the residual products of the preceding reaction.

Reference is now made to Figure 7, which shows an operating set-up appropriate for a conversion of hydrocarbons, such as the vapor phase cracking of petroleum hydrocarbons to gasoline. A charging stock of the type conventionally used in cracking operations is fed through pipe 44 by pump 45 to a vapor preparation unit which, with the pipe 44, the pump 45, and the pipe 47, will be hereinafter referred to as the "charging stock delivery means." Vapor preparation unit 46 will consist essentially of a heater, for which purpose any of the usual forms of heater common in the art, say a pipe still, may be used, to heat and vaporize the charge and heat it to reaction temperature, and, if the charge used is not wholly vaporized at the reaction temperature, of a vapor separator to remove unvaporized liquid residue. Vapors from 46 move through pipe 47 into and through reaction chamber or conversion chamber 48 (the same as 10, Figure 1), and therein undergo catalytic reaction. Reaction products pass through pipe 49 to product purification and recovery equipment denoted by 50. The equipment 50 may be made up of any of the usual fractionation, separation, and disposal devices currently in common use for handling products of cracking reactions. If desired, product fractions boiling above the desired low-boiling product may be returned to the system for re-treatment, either separately or in admixture with fresh charge. Catalytic material flowing from 48 is purged in 51 (which, as aforesaid, effects a seal between the bottom of chamber 48 and the top of chamber 53) and is elevated by 52, which introduces the spent catalyst into the top of chamber 53. In chamber 53 the spent catalyst moving downwardly therethrough is regenerated by burning with air supplied by blower and pipe 54. The products of regeneration are removed through pipe 55. The regenerated catalyst is purged in 56 (which effects a seal between the bottom of chamber 53 and the top of chamber 48) and is returned by gravity to the conversion chamber 48. The temperature level of the reaction in 48 may be controlled and latent heat of reaction added thereto by a heat exchange medium introduced through pipe 57 and removed through pipe 58. The same heat exchange medium may, in the arrangement shown in Figure 7, be used to control the temperature of regeneration in 53. As aforesaid, the heat exchange medium in the regenerating zone or chamber 53 is used to control the temperature of regeneration. This is accomplished in an exothermic regeneration reaction by maintaining the temperature of the heat exchange medium within a range such that heat is positively removed from within the body of moving catalyst so that the temperature of the catalyst does not drop below the temperature for efficient regeneration or combustion and does not rise to a temperature which would cause substantial heat damage to the catalyst material. For example, the temperature for regeneration of a spent clay catalyst for cracking hydrocarbons may range from around the cracking temperature (from about 800° F. to about 950° F.) to a peak temperature in the neighborhood of 1050° F. to 1100° F. Care should be exercised in the control of the temperature of the heat exchange medium circulated in the regenerator so that the temperature of the catalyst passing through the regenerator does not rise substantially above 1200° F., or serious damage to a catalyst of this type may result. In the arrangement shown in Figure 7 the heat exchange medium is introduced into the heat exchange conduits in the regenerator 53 by pipe 59 and is removed by pipe 60. It is circulated by pump 61. The temperature for the several uses may be controlled by use of various combinations of heat exchangers 62 and 63 and by-passes 64, 65, and 66 in a manner obvious to those skilled in the art.

As an example of one operation successfully conducted in such apparatus according to the process herein disclosed, coastal gas oil with which was admixed steam to the extent of about $$\frac{10 \text{ oil}}{1 \text{ water}}$$

(cold volumes) at a temperature of 800° F. was contacted with a catalyst of activated clay granules at a rate of one volume of oil (cold) to four volumes of clay in a chamber through which the clay passed at such a rate that it remained in the reaction zone about twenty minutes, with the following results:

Yield of 410° E. P. gasoline (including isobutane and heavier in gas)
          volume percent__ 67.4
Yield of dry gas (lighter than isobutane)
          weight percent__ 4.0
Yield of coke_____do____ 2.5
Yield of recycle stock_____volume percent__ 35.0

In this run the catalyst was passed through the regeneration chamber (of the same size as the reaction chamber) at the same rate and was burned with a sufficient volume of air to maintain above 10 per cent $CO_2$ in the exit flue gas.

The temperature of the reaction was held by use of the heat exchange medium at 800° F., and in the same manner the temperature of the regeneration was not allowed to rise above 1100° F.

The gasoline produced was of excellent quality, high in anti-knock rating, and the recycle stock was clean, light in color, and of about the same boiling point as the charge. No high-boiling, dirty, liquid cracking tar was produced. The regenerated catalyst was equal in efficiency to new catalyst, no detectable deterioration in quality being found.

It is to be understood that the specific examples and numerical data herein disclosed are set forth only as exemplary and that the invention is not to be limited thereby or thereto but is to be subject only to those limitations expressed in the following claims.

The subject matter of this application has been continuously pending before the United States Patent Office since September 4, 1937, the filing date of our application Serial No. 162,541, the continuity having been effected through the medium of our application Serial No. 361,440, filed October 16, 1940, of which this application is a continuation-in-part. Therefore, this application is a continuation-in-part of application Serial No. 162,541.

We claim:

1. A system for the catalytic conversion of petroleum hydrocarbons which comprises a substantially vertical conversion chamber, means including a substantially gas-tight valve above said chamber for admitting catalyst thereto and preventing vapor loss therefrom, means including a substantially gas-tight valve below said chamber for maintaining said chamber substantially full of catalyst material and for discharging catalyst therefrom at substantially the rate at which it is introduced thereto, means for continuously heating hydrocarbon vapors to a cracking temperature and for passing said heated vapors through said chamber, a fractionating system, means for introducing products from said conversion chamber to said fractionating system, a catalyst regeneration chamber, a plurality of tubes constructed of heat-conducting material disposed in said regeneration chamber and adapted to convey a liquid heat exchange medium in indirect heat exchange with catalyst in said regeneration chamber, means to circulate a fluid heat exchange medium through said tubes, means including the second named substantially gas-tight valve below said conversion chamber for admitting spent catalyst from said conversion chamber to said regeneration chamber and for preventing gases and vapors from the regeneration chamber from gaining access to said conversion chamber, means including a third gas-tight valve below the regeneration chamber for discharging regenerated catalyst therefrom at substantially the rate at which it is introduced thereto while preventing the escape of regeneration gases and vapors and means for returning regenerated catalyst discharged through said third-named gas-tight valve for introduction through said first-named gas-tight valve.

2. A system for the catalytic conversion of petroleum hydrocarbons which comprises a substantially vertical conversion chamber, means above said chamber for admitting catalyst thereto and preventing vapor loss therefrom, means below said chamber for maintaining said chamber substantially full of catalyst material and for discharging catalyst therefrom at substantially the rate at which it is introduced thereto, means for continuously heating hydrocarbon vapors to a cracking temperature and for passing said heated vapors through said chamber, a fractionating system, means for introducing products from said conversion chamber to said fractionating system, a catalyst regeneration chamber, a plurality of tubes constructed of heat-conducting material disposed in said regeneration chamber and adapted to convey a liquid heat exchange medium in indirect heat exchange with catalyst in said regeneration chamber, means to circulate a fluid heat exchange medium through said tubes, means for admitting spent catalyst from said conversion chamber to said regeneration chamber and for preventing gases and vapors from the regeneration chamber from gaining access to said conversion chamber, means below the regeneration chamber for discharging regenerated catalyst therefrom at substantially the rate at which it is introduced thereto while preventing the escape of regeneration gases and vapors and means for returning regenerated catalyst discharged from said means below the regeneration chamber to said means above the conversion chamber for reintroduction to the conversion chamber.

THOMAS P. SIMPSON.
JOHN W. PAYNE.
JOHN A. CROWLEY, Jr.